United States Patent [19]

Deno et al.

[11] Patent Number: 5,056,873
[45] Date of Patent: Oct. 15, 1991

[54] ADAPTIVE AIR BRAKING SYSTEM WITH CORRECTION FOR SECOND ORDER TRANSIENT EFFECTS

[75] Inventors: Milton C. Deno, Satellite Beach; Eugene A. Smith, Palm Bay; Dale H. Delaruelle, Melbourne, all of Fla.

[73] Assignee: Harris Corporation

[21] Appl. No.: 581,792

[22] Filed: Sep. 13, 1990

[51] Int. Cl.⁵ .............................................. B60T 15/22
[52] U.S. Cl. .......................................... 303/33; 303/20; 303/70; 303/86; 303/28; 303/66
[58] Field of Search ............................. 303/33, 28-30, 303/36, 38, 81, 86, 66, 20, 39, 45, 70, 80, 82, 64

[56] References Cited

U.S. PATENT DOCUMENTS 4,859,000  8/1989  Deno et al. ............................. 303/33

Primary Examiner—Douglas C. Butler
Attorney, Agent, or Firm—Evenson, Wands, Edwards, Lenahan & McKeown

[57] ABSTRACT

Method and apparatus for compensating for transient effects in pneumatically operated air brake system for a railway vehicle. A look up table or experimentally determined second order correction values is stored in a memory. Based on the magnitude of a previous application of the brakes, a correction value is selected from the look up table having a magnitude to compensate for transient errors in the system. The correction value is then diminished by fixed decrements at fixed intervals. Upon a subsequent application of the brakes, the diminished correction value is used to adjust the pressure communicated to braking mechanisms located on the train cars.

18 Claims, 7 Drawing Sheets

TENTATIVE SECOND ORDER CORRECTION
FOR 10.0 PSI APPLICATION

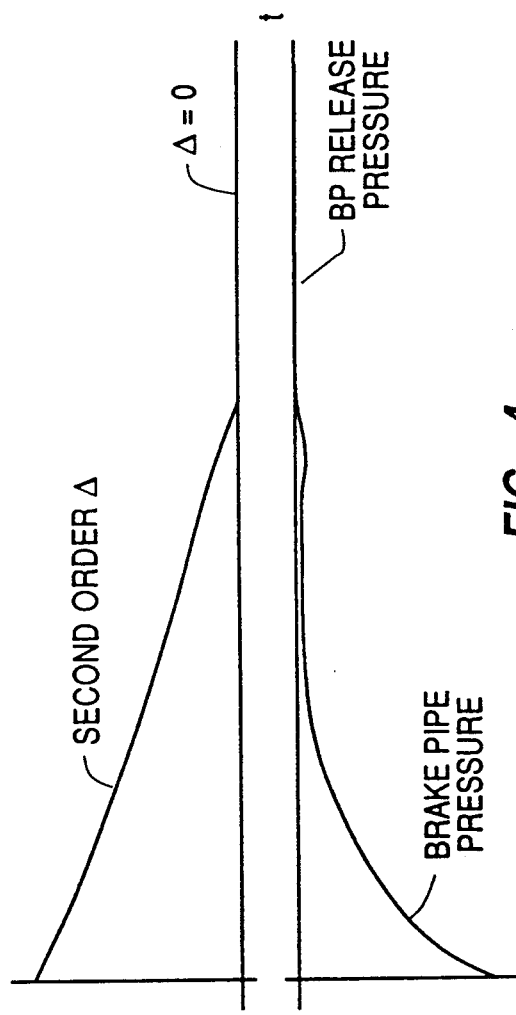

FIG. 9a

| PREVIOUS REDUCTION | PSI |
|---|---|
| 4 - 7.5 | 0.5 |
| 8 - 11.5 | 1.5 |
| 12 - 15.5 | 3.5 |
| 16 - 19.5 | 5.5 |
| 20 - 23.5 | 5.5 |
| 24 - 27.5 | 5.5 |
| 28+ | 5.5 |

DECREMENT VALUE = 0.5 PSI
DECREMENT INTERVAL = 15.0 SEC

FIG. 9b

| PREVIOUS REDUCTION | PSI |
|---|---|
| 4 - 7.5 | 1.0 |
| 8 - 11.5 | 2.5 |
| 12 - 15.5 | 4.5 |
| 16 - 19.5 | 6.5 |
| 20 - 23.5 | 6.5 |
| 24 - 27.5 | 6.5 |
| 28+ | 6.5 |

DECREMENT VALUE = 0.5 PSI
DECREMENT INTERVAL = 25.0 SEC

ADAPTIVE AIR BRAKING SYSTEM WITH CORRECTION FOR SECOND ORDER TRANSIENT EFFECTS

FIELD OF THE INVENTION

The present invention relates in general to air brake systems for railroad trains and is particularly directed to a control mechanism for ensuring effective braking action in accordance with prescribed operational characteristics of the brake system.

BACKGROUND AND SUMMARY OF THE INVENTION

One of the most critical aspects of the control of railway vehicles, particularly freight trains, is the predictable successful operation of the air brake system, which is subjected to a variety of dynamic effects as a result of the controlled application and release of brake pipe pressure in response to varying conditions encountered by the train.

In a typical air brake system employed by a railway freight train, the application and release of braking action is controlled by the engineman through an air brake control system in the locomotive. In such systems, braking force is conventionally applied to the wheels of each train car by pneumatically operated braking mechanisms in response to a reduction of the air pressure communicated to the braking mechanisms through a train air line which is coupled to a pressurized brake pipe in the air brake control system. Upon completion of a braking operation, the braking force applied by the respective braking mechanisms is released in response to restoration of the pressure in the train air line by the air brake control system operated by the engineman.

In braking systems of the type described, the magnitude of the braking force applied to the wheels of the train cars by the pneumatic braking mechanisms is directly proportional to the magnitude of the differential pressure reduction in the air line sensed by the respective braking mechanisms. However, due to the substantial volume of the air line, which extends the entire length of the train, an appreciable amount of time is required for the restoration of pressure in the air line to its original value following a braking operation. A subsequent application of the brakes prior to complete restoration of pressure in the air line thus results in the communication of a smaller differential pressure reduction to the pneumatic braking mechanisms at the train car wheels, and therefore less braking force than requested by the engineman via the air brake control system.

Even when he recognizes the insufficiency of the new braking application, the engineman often attempts to remedy the problem by a further application of the brakes. Again, however, the application of a braking effort which is less than expected will take place, so that there may still be inadequate braking action applied by the cars of the train. Simply put, if the engineman tries to make up for insufficient braking of one pressure reduction request in a piecemeal fashion, and under-corrects each time, it is possible that continuing efforts in this process will be unsuccessful due to increasing train speed, and that the originally intended braking effort and train speed will never be accomplished.

A method and apparatus to remedy this situation are disclosed in our commonly assigned U.S. Pat. No. 4,859,000, in which the air brake control system is modified to augment automatically the pressure reduction effected by the engineman whenever the brakes are applied prior to complete recharging of the train air line, so that the total amount of the pressure reduction communicated to the pneumatic braking mechanisms closely approximates that which would have been achieved had the train air line been fully charged. The improved adaptive braking system according to the above mentioned patent therefore increases the accuracy of the adaptive braking function by taking into account, and compensating for, first order transient effects in the charging and discharging of the train air line.

We have discovered that further improvements can be made to our adaptive braking system in order to provide a total braking effort which more closely approximates that expected by the engineman. In particular, the sensing method described in our U.S. Pat. No. 4,859,000 measures the decrease in the air line charging flow rate to signal the "equivalent pressure" of the train air line. This sensing method is characterized by inaccuracies due to hysteresis and frictional effects in the brake system control mechanism. In addition, the presence of second order transient effects in the propagation of pressure waves over the length of the air line during charging and discharging (often referred to as a "pressure hill"), provides a further source of error in the correction applied by the control system.

Accordingly, it is an object of the present invention to provide an improved adaptive air braking system which is not subject to the above mentioned hysteresis and frictional effects, and further compensates for inaccuracies in the system by taking into account the pressure hill effect.

This and other objects of the present invention are achieved by directly sensing the pressure in the brake line of the brake control system using a pressure transducer mounted thereon, and by providing a set of look up tables containing experimentally determined pressure reduction factors to compensate for the pressure hill and related effects. A central signal processing unit is programmed to select a second order correction value from the look up tables based on the magnitude of the previous reduction requested by the engineman. The correction value thus determined is then decremented over time so as to decay to zero when all transient effect in the brake control system have been eliminated. In the event that the brakes are reapplied prior to complete recharging of the train air line following a braking operation, an additional pressure reduction equal to the decremented correction value is added to the pressure reduction effected by the engineman and the first order correction referred to above.

Other objects, advantages and novel features of the present invention will be apparent from the following detailed description of the invention when considered in conjunction with the accompanying drawings.

BRIEF DESCRIPTION OF THE DRAWINGS

FIG. 3 is a tabular display of experimental data contained in the look up table according to the invention.

FIG. 4 is a graphic illustration of brake pipe pressure and the second order correction in accordance with the invention.

FIGS. 9a and 9b show sample alternative look up tables input by signal processing unit 140' in connection with the adjustment process illustrated in FIG. 8.

DETAILED DESCRIPTION OF THE DRAWINGS

Figure 1:
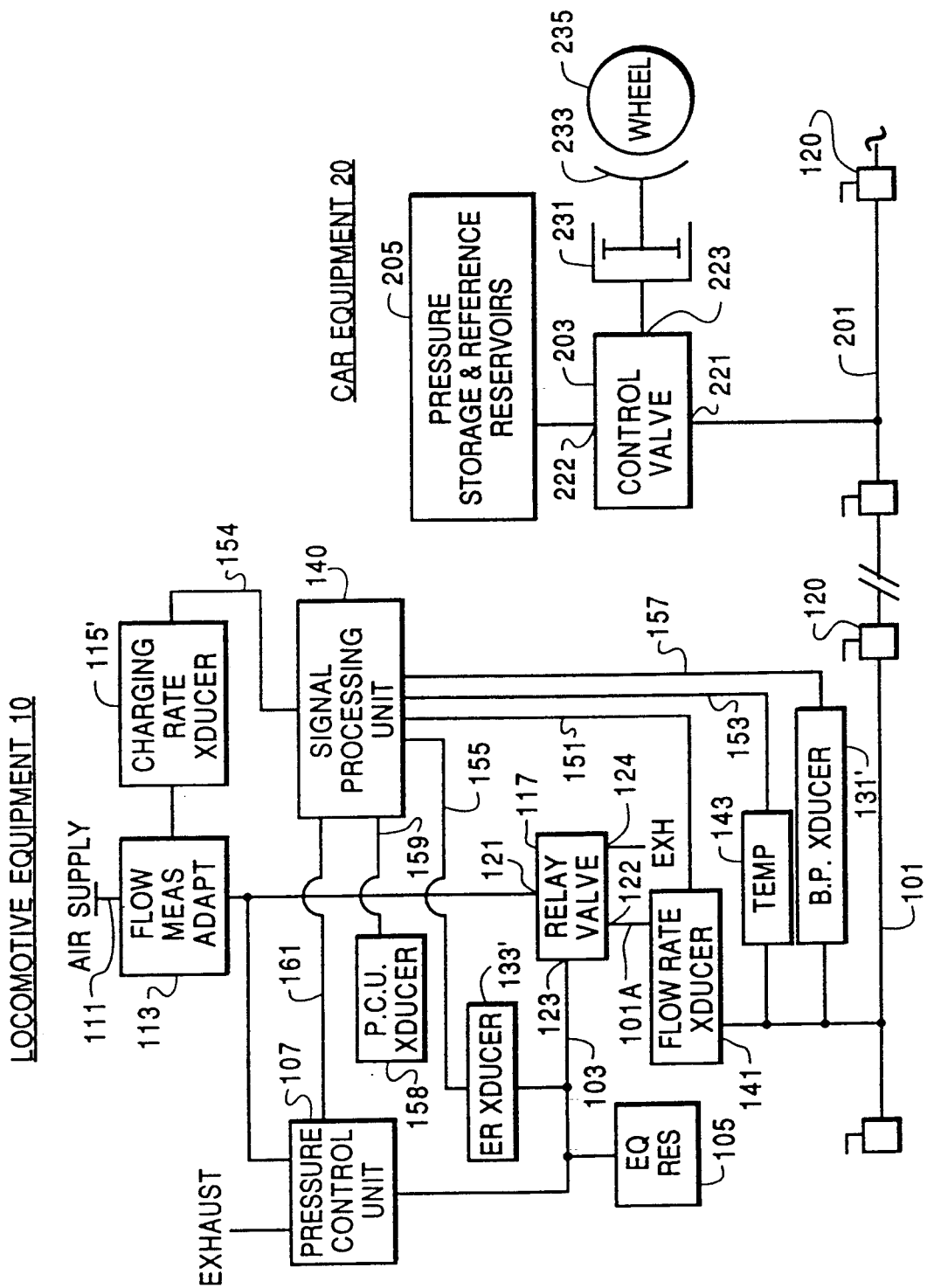
FIG. 1 depicts a prior art adaptive air brake system of the type disclosed in our U.S. Pat. No. 4,859,000.

Referring to FIG. 1, there is shown a prior art adaptive braking system of the type disclosed in our commonly assigned U.S. Pat. No. 4,859,000. For a detailed description of the operation of this adaptive braking system, the disclosure of said U.S. Pat. No. 4,859,000 is incorporated by reference herein in its entirety. For the purpose of understanding the present invention, it is sufficient to note that signal processing unit 140 (a microprocessor) is coupled to monitor the engineman's requested pressure reductions (input through pressure control unit 107), and also monitors the brake pipe 101 to determine whether it is currently undergoing a change in air pressure (as would be the case during the recharge of the brake pipe subsequent to the release of previous brake application).

As the pressure within the equalizing reservoir drops in response to the engineman's pressure reduction, the charging rate of the air flowing into the brake pipe will decrease as the dropping pressure within the equalizing reservoir 105 and the slowly rising pressure within the brake pipe approach each other. When the flow rate into the brake pipe becomes negligible (effectively equal to zero), which indicates that brake pipe 101 pressure is the same as that within the equalizing reservoir 105, the value of the pressure within the equalizing reservoir at that time is stored. Using this stored value, the requested equalizing reservoir pressure change is modified (increased) by a differential amount equal to the difference between the maximum pressure of the equalizing reservoir and the stored equalizing reservoir pressure value.

In operational tests of the adaptive braking system described above, it was found that additional sources of error exist. In particular, the use of the air line charging flow rate to signal the equivalent pressure in air line 201 introduces inaccuracies caused by hysteresis and frictional effects in relay valve 117, especially at very low pressure differentials. In addition, second order transient effects in the propagation of air pressure along the length of air line 201 are significant. That is, the actual pressure experienced at the respective braking mechanisms during charging of the air line lags behind the pressure measured at the locomotive brake pipe, due to the time required for the so-called "pressure hill" to be equalized across the entire length of the train.

Since the magnitude of the pressure correction generated by the adaptive braking system of FIG. 1 is based on the measurement of pressure in the brake pipe, which is situated in the braking control system in the locomotive, the effect of the above mentioned pressure hill is to cause the system to underestimated the magnitude of the pressure shortfall at the braking mechanisms distributed over the length of the train, and an additional correction is therefore required.

The amount of additional correction was determined experimentally by executing consecutive pressure reductions in the adaptive braking system of FIG. 1 and measuring the brake cylinder pressure and brake shoe movement of the brake mechanisms on the respective train cars as a function of time in order to determine the decay characteristics of the transient effects. That is, the brakes were first applied and released (sometimes herein referred to as a "first application", not to be confused with the term "First Service Application" as frequently used in the industry), and then after a selected time interval, applied again. The response at the train cars was then measured and recorded. Various combinations of pressure reductions and time interval between braking operations were used.

Figure 2:
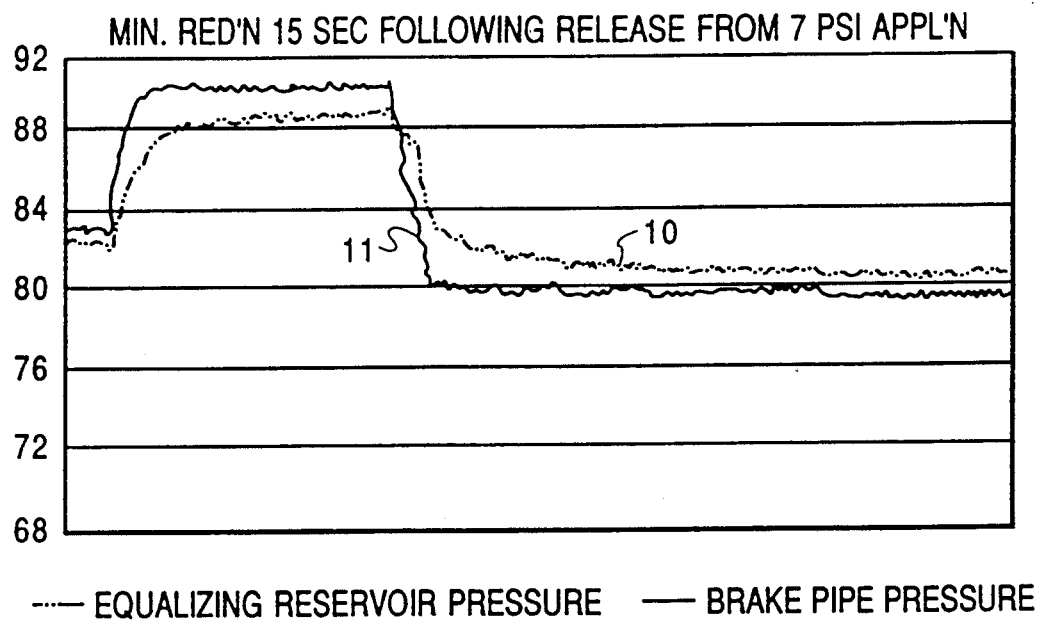
FIG. 2 is a graphic display of the pressure recorded in the equalizing reservoir and brake pipe in tests performed on the adaptive braking system of U.S. Pat. No. 4,859,000.

FIG. 2 shows the locomotive equalizing reservoir and brake pipe pressure recorded in one test on a 98 car train. The test sequence described above was followed and chart recordings were made of the brake pipe and equalizing reservoir pressures on the lead locomotive. Manual recordings were also made of the final brake cylinder pressure 24 cars behind the lead unit (not shown). The chart starts with a minimum application (7 psi reduction) in effect (equalizing reservoir pressure =83 psi and brake pipe pressure =82 psi). A brake release is then made, as indicated on the chart by the equalizing reservoir pressure 11 and brake pipe pressure 10 starting to rise toward the release pressure, which is 90 psi. After a period of 15 seconds a minimum (7 psi) application is made, and the equalizing reservoir pressure 11 and brake pipe pressure 10 start to drop. (Note that at the point of application, the pressure 10 in the brake pipe had not recovered to 90 psi.) The equalizing reservoir pressure 11 drops to 80 psi and brake pipe pressure 10 drops to 81 psi.

The results of numerous iterations of the above test procedure for various combinations of timing and pressure reductions demonstrated that the amount of the second order correction required to overcome the pressure hill effect is proportional to the magnitude of the pressure deficiency (due to incomplete charging of the air line) which prevails at the time that an application of the brakes is initiated. Thus for a particular application, the deeper the previous pressure reduction was, the greater the "hill effect" and the required second order correction will be. For example, if the release from a ten psi reduction is followed immediately by a second reduction, the necessary second order correction was determined to be 2.0 psi, while a twenty psi first reduction requires a correction of 6.0 psi FIG. 3 is a tabular presentation of the results of the above test procedures.

In addition, since the magnitude of the pressure deficiency in the air line decreases over time—that is, as the air line charges up to its original pressure level—the size of the necessary second order correction decreases over time as well. This characteristic is illustrated graphically in FIG. 4.

Figure 5:
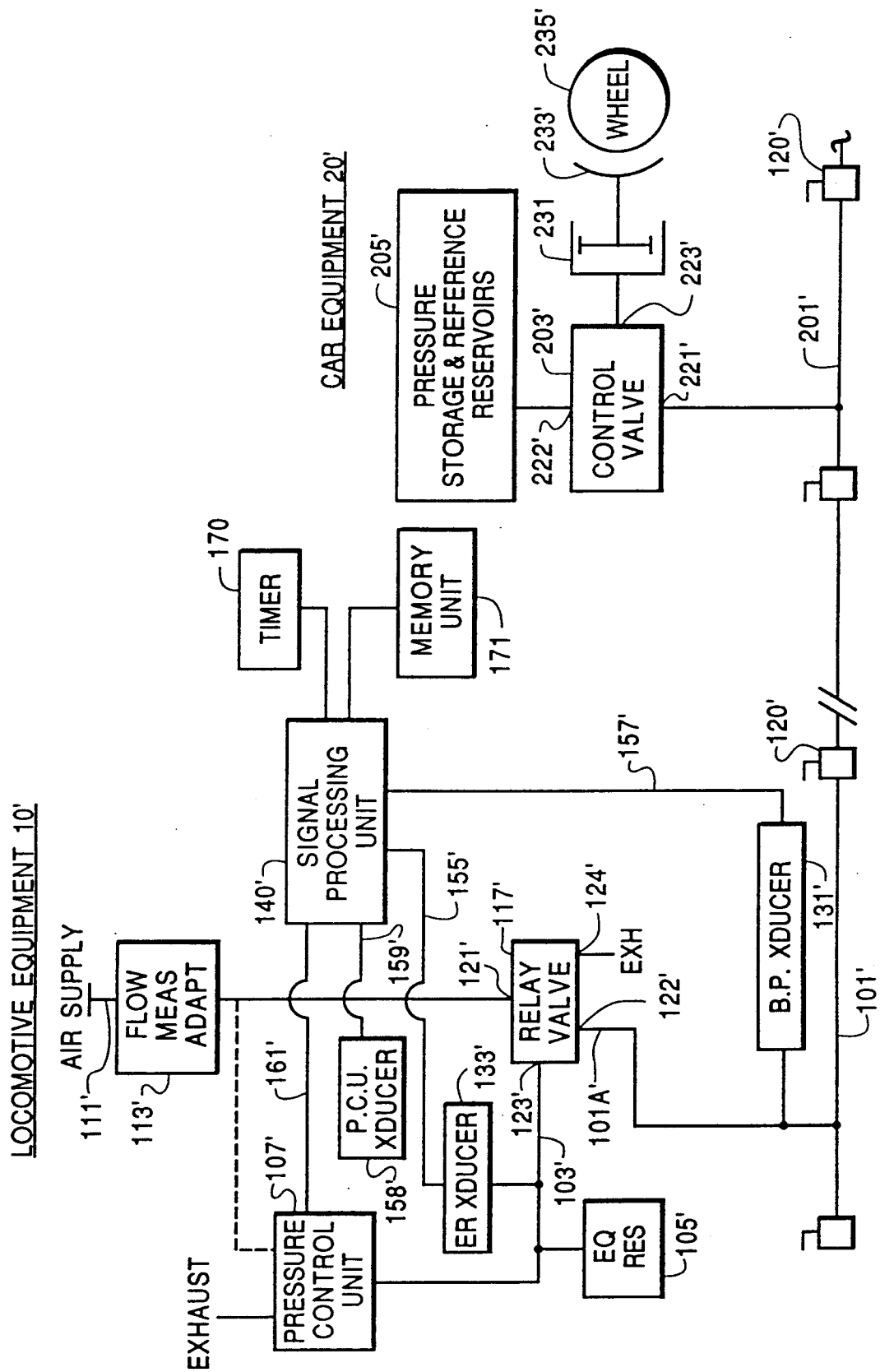
FIG. 5 shows an improved adaptive air brake system according to the invention.

Referring now to FIG. 5, there is illustrated an improved adaptive braking system in accordance with the present invention. To facilitate an understanding of the improved system, those elements which correspond to the prior art system of FIG. 1 are designated by the same (primed) reference numerals.

In the improved system according to the invention, charging flow rate transducer 115 has been eliminated. Brake pipe flow rate transducer 141 and temperature transducer 143 pertain to other aspects of the prior art patent, and are also not shown. In operation in accordance with the method of the present invention, a comparison of the pressure values sensed by brake pipe pressure transducer 131' and equalization reservoir transducer 133' is used to determine the magnitude of the necessary first order correction in lieu of utilizing a flow rate transducer in the manner disclosed in U.S. Pat. No. 4,859,000. That is, at the time when an application is initiated, signal processing unit 140' compares the respective pressure readings from transducers 131' and 133' and determines whether a difference exists. (Such a difference would occur where brake pipe 101'/train air line 201' have not fully charged following a previous application of the brakes.) If in fact a difference exists, the amount of the difference is then stored and is added to the equalizing reservoir pressure change requested by the engineman by operation of control unit 107'. By determining the magnitude of the pressure correction in this manner rather than by use of a flow rate transducer, it was found that frictional and hysteresis errors are eliminated, and a more accurate first order correction is effected.

With further reference to FIG. 5, signal processing unit 140' has coupled to it a timer 170 and a memory 171, and is also coupled to pressure control unit 107' to receive output signals representative of the magnitude and timing of pressure reductions and restorations as requested by the engineman. Memory 171 has stored therein the experimentally determined look up tables described above. In operation, each time the brakes are applied and released, signal processing unit 140' receives from pressure control unit 107' a signal indicating the amount of the total reduction (in psi), which is stored.

Signal processing unit 140' then queries the look up table stored in memory 171 and reads out a tentative second order correction factor based on the magnitude of the stored pressure reduction. As noted, above, however, as brake pipe 101' and air line 201' are recharged following a pressure reduction, the amount of the first order pressure differential decreases, and the amount of the second order correction decreases accordingly, as illustrated in FIG. 4. In order to account for this factor, timer 170 causes the magnitude of the tentative second order correction read from memory 171 to be decremented by the processing unit 140' by a predetermined amount at fixed intervals, until all transient effects in brake pipe 101' and air line 201' have decayed to zero, at which time all adaptive braking action is disabled— that is, the brake pipe air line is fully charged and no correction is necessary.

Figure 6:
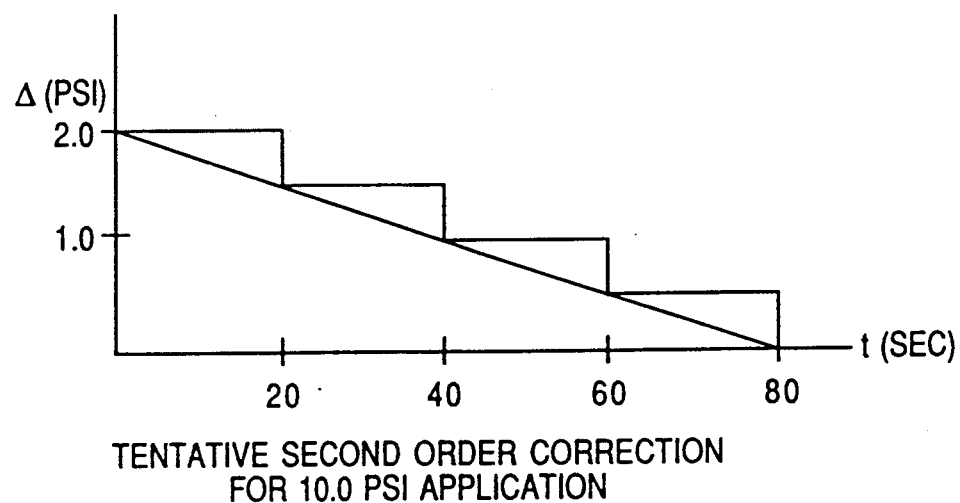
FIG. 6 is a graphic illustration of the time variable second order correction value implemented by the present invention.

Based on the data determined in accordance with the procedures described above, the tentative second order correction is decremented by 0.5 psi every twenty seconds, as illustrated in FIG. 6. It should be noted in this regard, however, that the magnitude of the required second order correction values as stored in the look up table, as well as the selection of the frequency and magnitude of the pressure decrement are dictated only by the response of the air line for the particular system, and will vary from train to train, dependent upon its length car type, air temperature and other factors. Moreover, for a particular system, other combinations of decrement and frequency may be used so long as they conform to the characteristic response of the system as depicted in FIG. 6. (For example, for the system tested as described above, a decrement of 0.25 psi at 10 second intervals could be used).

Upon initiation of a brake application prior to the complete charging of brake pipe 101' and air line 201', the amount of the decremented second order correction is added by signal processing unit 140' to the pressure reduction requested by the engineman and the first order correction determined as described above, in order to effect an actual differential pressure reduction in air line 201' which will result in a braking force that accurately accords with that requested by the engineman.

Figure 7:
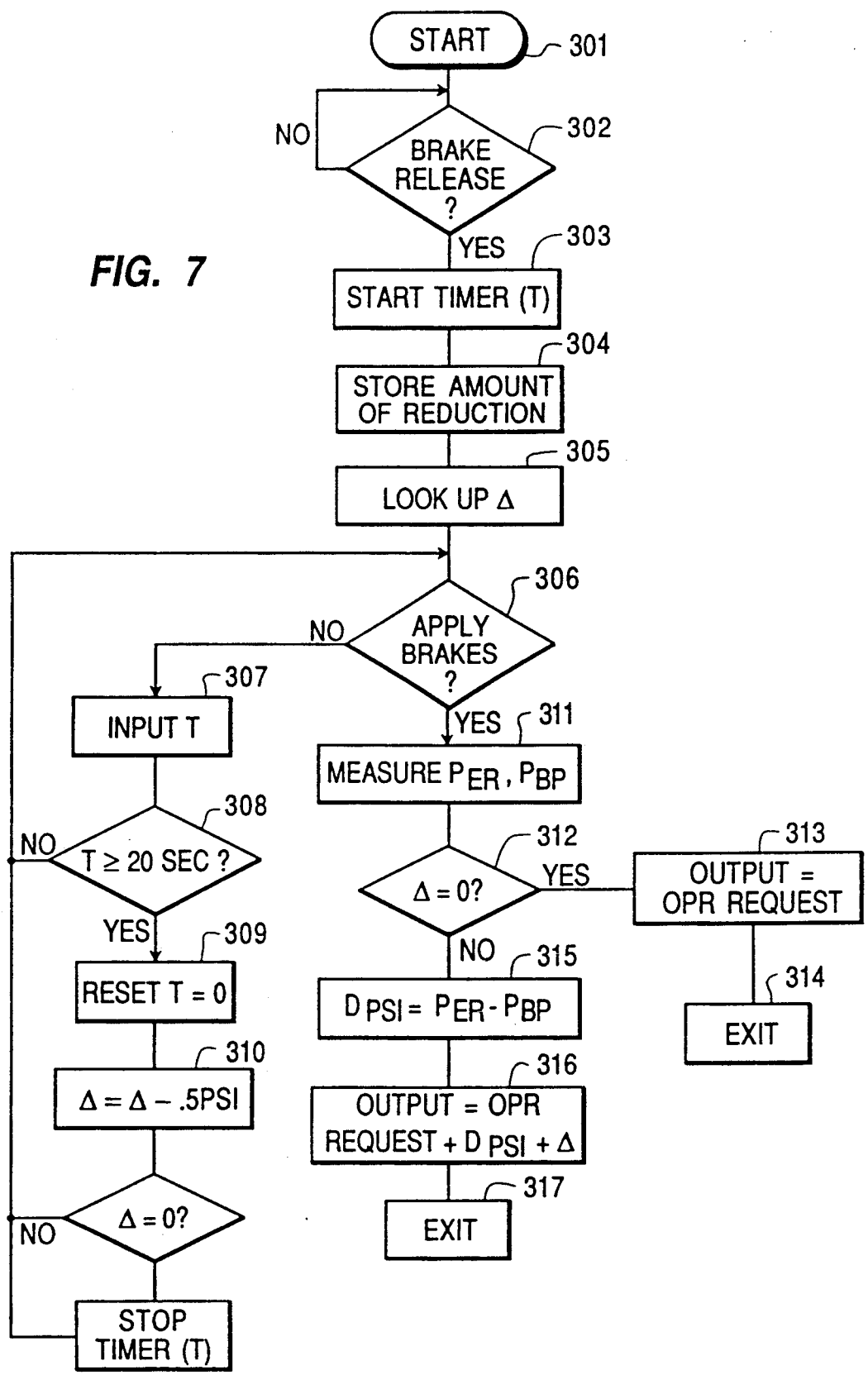
FIG. 7 is a flow diagram which illustrates the steps of an improved adaptive braking control system according to the invention.

The sequence of steps that are executed by signal processing unit 140' in order to implement the first and second order adaptive braking control system according to the invention are illustrated in the flow diagram of FIG. 7. For the purpose of this diagram, it is assumed that the train is initially engaged in a braking application at <Start> step 301. When the engineman initiates a <Brake Release> (step 302) by operating pressure control valve 107', signal processing unit 140' starts timer 170 (step 303) and at the same time receives from pressure control unit 107', a signal representing the magnitude of the just released pressure reduction, which is stored (step 304). At this time, signal processing unit 140' queries memory 171 and reads out a tentative second order correction Δ corresponding to the stored value (Step 305).

At step 306 <Apply Brakes?> a determination is made whether a subsequent braking application has been initiated. In the event that a second application follows immediately upon a previous application, the output from step 306 is "yes", and signal processing unit 140' then acquires pressure readings from equalization reservoir 105' ($P_{ER}$) and brake pipe 101' ($P_{BP}$) at step 311 <Measure $P_{ER}$, $P_{BP}$>. If the second order correction Δ=0 (step 312), then brake pipe 101' and air line 201' have fully recharged and no correction is necessary, and the output from the control system is equal to the pressure reduction requested by the engineman (step 313). If at the time the brakes are applied, however, the Δ is not 0 (step 312) then the recharging of the brake pipe/air line has not reached steady state. Signal processing unit 140' therefore, determines the pressure differential $D_{psi}$ as the difference between $P_{ER}$ and $P_{BP}$ (step 315), and the output of the control system is calculated by signal processing unit 140' as the sum of the pressure reduction requested by the engineman plus the first order pressure correction $D_{psi}$, plus the second order correction Δ (step 316).

In the event that a period of more than 20 seconds elapses between the release of a first pressure reduction and the initiation of a second reduction, the amount of the second order correction Δ necessary to counteract the transient pressure hill in air line 201' is decremented as noted previously. This operation is accomplished by steps 307 through 310 as follows:

After a release of the brakes and the determination of a tentative second order correction Δ from the look up table in memory 171 (step 305), if a second application has not been initiated (step 306), signal processing unit 140' receives the output signal T (step 307) from timer 170 and determines whether 20 seconds have elapsed since the start of the timer in step 303. At the point when T=20 sec., timer 170 is reset to zero (step 309) and signal processing unit 140' reduces the value of the second order correction determined in step 305, by 0.5 psi (step 310). At this point, if the brakes still have not been applied, steps 307 through 310 are repeated until either the system reaches steady state (that is, the air line is fully recharged and no correction is necessary) (step 313), or the brakes are applied and the decremented value of the second order correction Δ is used to calculate the output reduction in steps 315–317 so that the correct braking force as requested by the engineman is applied to the wheels of the cars 20'.

As noted previously, in practice the magnitude of the actual correction value necessary to compensate for second order transient effects is dictated by the response of the air line for the particular system, and thus will vary from train to train, dependent upon its length and other factors. Therefore, according to a preferred embodiment of the invention, signal processing unit 140' is adapted to monitor and adjust automatically to these train characteristics by modifying the look up table based on actual train response during operation.

Whenever the brakes are released from a heavy application such as a full service application, the rate of change of the brake pipe pressure $P_{BP}$ is indicative of the train length and air brake system characteristics, such as effective air line volume. This effect is used to modify the adaptive braking feature to reflect these train characteristics. That is, the number of seconds required for the brake pipe pressure $P_{BP}$ to rise 20 psi from the full service application pressure is used to select a train-specific look up table and decay rate for the adaptive braking functions. (Alternatively, the decay in the charging flow rate can be used to select these parameters.) This function is repeated with each release from a full service application during train operation. Thus, the system automatically adjusts to changing length as train cars are added to or removed from the train. The steps executed by signal processing unit 140' to effect the adjustment referred to above are shown in the flow chart in FIG. 8.

When the system is initially turned on, a default correction table is installed in memory unit 171 (step 401). This table represents the characteristics of a "nominal train", such as shown in FIG. 3, and remains in effect until a release from a full service (25 psi) application is made. Such a release is always part of a mandatory terminal brake test.

When the system detects a full service application followed by a release of the brakes (steps 402, 403), a timing sequence is initiated by signal processing unit 140', at the same time brake pipe pressure $P_{BP}$ is read and stored. (Steps 404, 405). When the brake pipe pressure $P_{BP}$ has risen 20 psi, signal processing unit 140' again reads the timer (step 407). If at this point the elapsed time since the initial reading is less than or equal to 8 seconds, that is, the brake pipe pressure $P_{BP}$ has risen 20 pounds in less than 8 seconds indicating a relatively short train, signal processing unit 140' causes the correction look up table stored in memory unit 170 to be changed to the table set forth in FIG. 9a, in which the correction values are relatively smaller (step 409).

If, on the other hand, the time required for brake pipe pressure $P_{BP}$ to rise 20 psi is greater than 8 seconds and less than or equal to 18 seconds, (step 410) no further adjustment of the correction look up table is required, and the modification sequence is terminated (step 411). However, if more than 18 seconds is required for the brake pipe pressure $P_{BP}$ to recover by 20 psi, indicating a relatively long train, signal processing unit 140' causes the input tables stored in memory unit 171 to be modified to conform to the tables set forth in FIG. 9b, in which the correction values are relatively higher (step 412). At this time the adjustment cycle is terminated.

Figure 8:
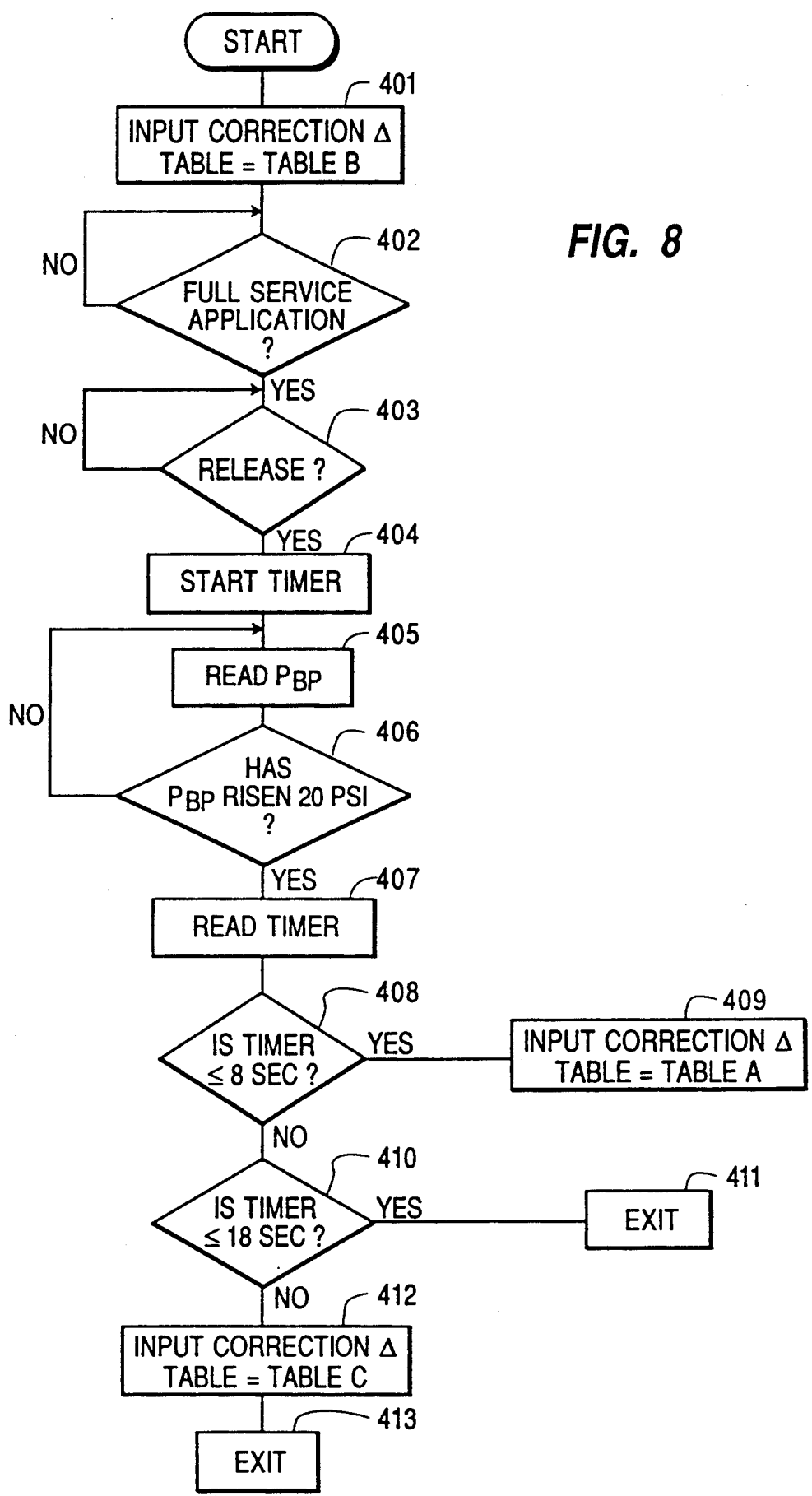
FIG. 8 is a flow diagram which illustrates the steps performed by signal processing unit 140' in adjusting the look up table correction values according to a preferred embodiment of the invention.

It is apparent that numerous variations of the above process are possible. For example, instead of 8 and 18 seconds as the break points, 7 and 15 seconds could be used. Additionally, more than two break points could be used, with a correspondingly larger number of alternative correction tables, in order to achieve even greater accuracy in the adjustment. Finally, in lieu of using brake pipe pressure as the input variable, the charging flow rate in the brake pipe could be used, with, for example, a break point of 50 cubic feet per minute in place of step 408 as indicated in FIG. 8.

As will be appreciated from the foregoing description, the present invention enhances the ability of a train control system to successfully apply braking and stop the train by means of an adaptive control mechanism that controllably modifies action taken by the engineman in order to continuously enable the braking system to adapt itself to dynamic operating conditions.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. For use with the brake system of a railway train which has a locomotive having a braking control coupled in fluid communication with one or more train cars each of which has a brake mechanism for applying braking force thereto in response to a reduction in the pressure communicated by said braking control and for releasing said braking force in response to restoration of said pressure, said braking control comprising an equalizing reservoir, means for controlling pressure in said equalizing reservoir in response to requests communicated by an operator, and means for causing the pressure communicated to said brake mechanisms to increase or decrease in response to changes in the pressure in said equalizing reservoir, a method of controlling the pressure in said equalizing reservoir, and thereby the pressure communicated to said train cars, in response to a request for reduction in the pressure in said equalizing reservoir, comprising the steps of:

(a) measuring the pressure in said equalizing reservoir and in said brake pipe in response to a request for application of the train's brakes;

(b) determining a pressure reduction correction value equal to the difference between the measured pressures in said equalizing reservoir and in said brake pipe in response to said request for a reduction of the pressure in said equalizing reservoir; and (c) causing the pressure in said equalizing reservoir to be modified by an amount equal to said pressure reduction correction value, whereby the pressure communicated to said brake mechanisms is caused to be reduced by an amount corresponding to said requested reduction.

2. For use with the brake system of a railway train which has a locomotive having a braking control coupled in fluid communication with one or more train cars each of which has a brake mechanism for applying braking force thereto in response to a reduction in the pressure communicated by said braking control and for releasing said braking force in response to restoration of said pressure, said braking control comprising an equalizing reservoir, means for controlling pressure in said equalizing reservoir in response to requests communicated by an operator, and means for causing the pressure communicated to said brake mechanisms to increase or decrease in response to changes in the pressure in said equalizing reservoir, a method of controlling the pressure in said equalizing reservoir, and thereby the pressure communicated to said train cars, in response to a request for reduction in the pressure in said equalizing reservoir, comprising the steps of:

(a) measuring the pressure in said equalizing reservoir and in said brake pipe in response to a request for application of the train's brakes;

(b) determining a pressure reduction correction value equal to the difference between the measured pressures in said equalizing reservoir and in said brake pipe in response to said request for a reduction of the pressure in said equalizing reservoir; and (c) causing the pressure in said equalizing reservoir to be modified by an amount equal to said pressure reduction correction value; and (d) causing said pressure in said equalizing reservoir to be further modified by an experimentally determined second order correction value having a magnitude to compensate for errors introduced by time delay in the communication of pressure increases and decreases to said train cars, whereby the pressure effectively communicated to said train cars is caused to be reduced by an amount corresponding to said requested reduction.

3. The method according to claim 2, wherein said second order correction value in step (d) is determined from a look up table of experimentally derived correction values, based on the magnitude of a previous pressure reduction in said equalizing reservoir.

4. Method according to claim 3, wherein said look up table is modified during operation of the train to adapt to actual train response to release of a pressure reduction.

5. Method according to claim 4, wherein modification of said look up table is dependent on the time required for the pressure in said brake pipe to increase to one or more predetermined levels following release of a pressure reduction.

6. Method according to claim 4, wherein modification of said look up table is dependent on the time required for a charging flow rate of said brake pipe to fall below one or more predetermined levels following release of a pressure reduction.

7. The method according to claim 3, wherein said second order correction value in step (d) is decremented by a predetermined amount at predetermined intervals following release of a previous pressure reduction.

8. The method according to claim 2, wherein said second order correction is determined based on the magnitude of a previous pressure reduction, by the steps of:

(d1) measuring and storing the magnitude of a previous pressure reduction;

(d2) selecting from a look up table of experimentally derived second order correction values, a tentative second order correction value which corresponds to the stored magnitude of said previous pressure reduction; and (d3) causing said tentative second order correction value to be reduced in predetermined decrements at predetermined time intervals following said previous pressure reduction.

9. For use with the brake system of a railway train which has a locomotive having a braking control coupled in fluid communication with one or more train cars each of which has a brake mechanism for applying braking force thereto in response to a reduction in the pressure communicated by said braking control and for releasing said braking force in response to restoration of said pressure, said braking control comprising an equalizing reservoir, means for controlling pressure in said equalizing reservoir in response to requests communicated by an operator, and means for causing the pressure communicated to said brake mechanisms to increase or decrease in response to changes in the pressure in said equalizing reservoir, a method of controlling the pressure in said equalizing reservoir, and thereby the pressure communicated to said train cars, in response to a request for reduction in the pressure in said equalizing reservoir, comprising the steps of:

(a) measuring and recording a magnitude of a previous reduction of pressure in said equalizing reservoir;

(b) selecting from a look up table of experimentally determined second order correction values, a tentative second order correction value which corresponds to the recorded magnitude of said previous pressure reduction;

(c) causing said tentative second order correction value to be diminished in predetermined decrements at predetermined time intervals following said previous pressure reduction; and (d) causing the pressure communicated to said train cars in response to said request for reduction to be modified by an amount equal to the diminished second order correction value.

10. Method according to claim 9, wherein said look up table is modified during operation of the train to adapt to actual train response to release of a pressure reduction.

11. Method according to claim 10, wherein modification of said look up table is dependent on the time required for the pressure in said brake pipe to increase to one or more predetermined levels following release of a pressure reduction.

12. Method according to claim 10, wherein modification of said look up table is dependent on the time required for a charging flow rate of said brake pipe to fall below one or more predetermined levels following release of a pressure reduction.

13. For use with the brake system of a railway train having a locomotive which contains an equalizing reservoir and a brake pipe coupled in fluid communication therewith through a brake pipe control valve, said brake pipe control valve being coupled to a source of braking control fluid through which said brake pipe is controllably charged, and one or more cars each of which contains a brake pressure reference reservoir and a train fluid line coupled in fluid communication therewith through a brake mechanism control valve, said fluid line and said brake pipe being in fluid communication with one another, so that said fluid line may be controllably charged through said brake pipe control valve, in accordance with the control of the fluid pressure within said equalizing reservoir, a method of controlling the pressure in said equalizing reservoir, and thereby the pressure in said fluid line through which said brake control mechanism is controlled, in response to a request for a reduction in the pressure in said equalizing reservoir, comprising the steps of:

(a) measuring the pressure in said equalizing reservoir and in said brake pipe in response to a request for application of the train's brakes;

(b) determining a pressure reduction correction value equal to the difference between the measured pressures in said equalizing reservoir and in said brake pipe in response to said request for a reduction of the pressure in said equalizing reservoir; and (c) causing the pressure in said equalizing reservoir to be modified by an amount equal to said pressure reduction correction value, whereby the pressure communicated to said brake mechanisms is caused to be reduced by an amount corresponding to said requested reduction.

14. For use with the brake system of a railway train having a locomotive which contains an equalizing reservoir and a brake pipe coupled in fluid communication therewith through a brake pipe control valve, said brake pipe control valve being coupled to a source of braking control fluid through which said brake pipe is controllably charged, and one or more cars each of which contains a brake pressure reference reservoir and a train fluid line coupled in fluid communication therewith through a brake mechanism control valve, said fluid line and said brake pipe being in fluid communication with one another, so that said fluid line may be controllably charged through said brake pipe control valve, in accordance with the control of the fluid pressure within said equalizing reservoir, a method of controlling the pressure in said equalizing reservoir, and thereby the pressure in said fluid line through which said brake control mechanism is controlled, in response to a request for a reduction in the pressure in said equalizing reservoir, comprising the steps of:

(a) measuring the pressure in said equalizing reservoir and in said brake pipe in response to a request for application of the train's brakes;

(b) determining a pressure reduction correction value equal to the difference between the measured pressures in said equalizing reservoir and in said brake pipe in response to said request for a reduction of the pressure in said equalizing reservoir; and (c) causing the pressure in said equalizing reservoir to be modified by an amount equal to said pressure reduction correction value; and (d) causing said pressure in said equalizing reservoir to be further modified by an experimentally determined second order correction value having a magnitude to compensate for errors introduced by time delay in the communication of pressure increases and decreases to said train cars, whereby the pressure effectively communicated to said train cars is caused to be reduced by an amount corresponding to said requested reduction.

15. In a brake system for a railway train of the type which has a locomotive having a braking control coupled in fluid communication with one or more train cars each of which has a brake mechanism for applying braking force thereto in response to a reduction in the pressure communicated by said braking control and for releasing said braking force in response to restoration of said pressure, said braking control comprising an equalizing reservoir, means for controlling pressure in said equalizing reservoir in response to requests communicated by an operator, and means for causing the pressure communicated to said brake mechanisms to increase or decrease as a function of changes in the pressure in said equalizing reservoir in response to requests from said operator, the improvement comprising:

means for measuring and recording the magnitude of a first reduction in the pressure in said equalizing reservoir;

memory means for storing a plurality of experimentally determined second order correction values having a magnitude to compensate for errors due to transient effects in the communication of pressure changes to said train cars, said correction values being dependent on the magnitude of a previous reduction of pressure in said equalizing reservoir;

means for selecting from said second order correction values stored in said memory means, a tentative second order correction value which corresponds to the recorded magnitude of said first reduction in pressure;

control means for causing the pressure communicated to said train cars by said braking control, in response to a request for a subsequent reduction in pressure, to be modified by a second order correction based upon the tentative second order correction value selected from said memory means.

16. Apparatus according to claim 15, wherein said control means further comprises means for causing said tentative second order correction value to be diminished by a predetermined decrement at predetermined intervals following release of said first reduction of pressure, said second order correction being equal to the diminished tentative second order correction value upon the occurrence of a subsequent request for a reduction of pressure.

17. Apparatus according to claim 16, wherein said predetermined decrement is 0.5 psi and said predetermined intervals are twenty seconds.

18. In a brake system for a railway train of the type which has a locomotive having a braking control coupled in fluid communication with one or more train cars each of which has a brake mechanism for applying braking force thereto in response to a reduction in the pressure communicated by said braking control and for releasing said braking force in response to restoration of said pressure, said braking control comprising an equalizing reservoir, means for controlling pressure in said equalizing reservoir in response to requests communicated by an operator, and means for causing the pressure communicated to said brake mechanisms to increase or decrease as a function of changes in the pressure in said equalizing reservoir in response to requests from said operator, the improvement comprising:

a memory having stored therein a look up table containing a plurality of experimentally determined second order correction values having a magnitude to compensate for errors due to transient effects in the communication of pressure changes to said train cars, said correction values being a function of the magnitude of a previous reduction of pressure in said equalizing reservoir;

means for measuring the magnitude of a first reduction in the pressure in said equalizing reservoir;

a timer for measuring the time elapsed following release of said first reduction in the pressure in said equalizing reservoir;

a signal processing unit coupled in communication with said memory, said means for measuring, said timer and said means for controlling the pressure in said equalizing reservoir, said signal processing unit being adapted to receive and store a measurement of the magnitude of said first reduction in pressure, to select from said look up table a tentative second order correction value which corresponds to the stored magnitude of said first reduction in pressure, and to diminish said tentative second order correction value by predetermined decrements at predetermined time intervals in response to signals received from said timer;

and said signal processing unit being further adapted, in response to a request for a reduction in the pressure in said equalizing reservoir, to cause the pressure in said equalizing reservoir to be modified by an amount equal to the diminished second order reduction value.

* * * * *